(12) United States Patent
Singuru et al.

(10) Patent No.: US 10,668,845 B2
(45) Date of Patent: Jun. 2, 2020

(54) MOISTURE DETECTION AND REGULATION IN A VEHICLE INTERIOR COMPONENT

(71) Applicant: GM Global Technology Operations LLC, Detroit, MI (US)

(72) Inventors: Kausalya Singuru, Troy, MI (US); David R. Petrucci, Warren, MI (US); Gregg R. Kittinger, Oakland Township, MI (US); Xiujie Gao, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 15/962,640

(22) Filed: Apr. 25, 2018

(65) Prior Publication Data
US 2019/0331624 A1  Oct. 31, 2019

(51) Int. Cl.
  *B60N 2/90*  (2018.01)
  *B60H 1/00*  (2006.01)
  *B60N 2/56*  (2006.01)

(52) U.S. Cl.
  CPC .......... *B60N 2/90* (2018.02); *B60H 1/00285* (2013.01); *B60H 1/00785* (2013.01); *B60N 2/5628* (2013.01); *B60N 2/5657* (2013.01); *B60N 2/5685* (2013.01)

(58) Field of Classification Search
  None
  See application file for complete search history.

(56) References Cited

U.S. PATENT DOCUMENTS

| 9,956,893 | B2 * | 5/2018 | Yang | B60N 2/22 |
| 10,343,485 | B1 * | 7/2019 | Yaldo | B60H 1/00285 |
| 2012/0084995 | A1 * | 4/2012 | Vogel | D06F 58/00 34/492 |
| 2017/0072767 | A1 * | 3/2017 | Salter | B60R 1/00 |

FOREIGN PATENT DOCUMENTS

| GB | 201702548 | * | 4/2017 | B60H 1/00878 |
| WO | WO-2016206277 A1 | * | 12/2016 | B60N 2/22 |

* cited by examiner

*Primary Examiner* — Justin N Olamit
(74) *Attorney, Agent, or Firm* — Quinn IP Law

(57) ABSTRACT

A moisture detection and regulation system is disclosed for a vehicle interior component having a section of material with a moisture absorbent material structure. The system includes a sensing device configured to detect a level of moisture in the section of material. The system also includes a moisture removal element configured to dissipate moisture from the section of material. The system additionally includes an electronic controller fixed to the vehicle structure and in operative communication with each of the sensing device and the moisture removal element. The controller is configured to receive a signal from the sensing device indicative of the detected level of moisture in the section of material and activate the moisture removal element when the detected level of moisture is equal to or greater than a predetermined threshold level of moisture. A vehicle having such a moisture detection and regulation system is also disclosed.

16 Claims, 3 Drawing Sheets

MOISTURE DETECTION AND REGULATION IN A VEHICLE INTERIOR COMPONENT

TECHNICAL FIELD

The present disclosure relates to moisture detection and regulation in vehicle interior components.

BACKGROUND

Vehicles are typically equipped with vehicle interiors designed to accommodate the vehicle operator, passenger(s), their possessions, and vehicle cargo. A vehicle interior typically includes various components configured to provide comfort and security for vehicle passengers, as well as enhance convenience for various vehicle use. Such components may include seat assemblies, bins, shelves, etc. having various upholstered surfaces intended to come into contact with the vehicle's user and/or the user's belongings.

Over the course of regular vehicle use, such components may be subjected to various fluid spills. The components' upholstered surfaces may, however, include materials or fabrics that absorb and/or retain moisture. For example, a typical vehicle seat includes one or more seat cushions that are generally covered in specifically selected fabric(s). A liquid spilled onto such a cushion may be absorbed and retained by the cushion's fabric for an extended duration, which become a source of discomfort for the vehicle's occupant. Accordingly, continued presence of liquid or retained moisture on such upholstered components may cause inconvenience to the vehicle user(s), and discourage exploitation of the vehicle.

SUMMARY

A moisture detection and regulation system for a vehicle interior component having a section of material with a moisture absorbent material structure. The moisture detection and regulation system includes a sensing device configured to detect a level of moisture in the section of material. The system also includes a moisture removal element configured to dissipate moisture from the section of material. The system additionally includes an electronic controller fixed to the vehicle structure and in operative communication with each of the sensing device and the moisture removal element. The controller is configured to receive a signal from the sensing device indicative of the detected level of moisture in the section of material and activate the moisture removal element when the detected level of moisture is equal to or greater than a predetermined threshold level of moisture.

The vehicle component may be a seat assembly having a seat cushion. In such an embodiment, the moisture removal element may be embedded in or mounted proximate the seat cushion.

The seat assembly may include a backrest and a seating pad. In such an embodiment, the seat cushion may be incorporated into one of the backrest and the seating pad.

The moisture removal element may be a fan mounted within the interior of the vehicle, such as on the vehicle component or as part of the vehicle's HVAC system. The moisture removal element may be configured to blow air onto or through the section of material to thereby dissipate moisture therein.

The moisture removal element maybe an electrical element mounted proximate the section of material, and configured to generate heat energy and impart the heat energy to the section of material.

The sensing device may be the electrical element. In such an embodiment, the electronic controller may be configured to determine an instantaneous resistance or conductivity of the electrical element to thereby identify a type of liquid present in the section of material.

The system may additionally include a sensory input element. In such an embodiment, the electronic controller may be configured to activate the sensory input element to thereby generate a warning signal, for example to a user of the vehicle or a fleet vehicle monitor, indicative of the detected level of moisture and/or the identified type of liquid present in the section of material.

The sensing device may be an infrared sensor employed to detect an image indicative of the level of moisture in the section of material.

The electronic controller may be configured to determine a rate of change of the detected level of moisture in the section of material and predict an amount of time required to reduce the detected level of moisture in the section of material below the predetermined threshold level of moisture. The prediction may be communicated to a user of the vehicle or to a fleet vehicle monitor.

The electronic controller may be configured to activate the moisture removal element at each predetermined event when the section of material is unoccupied.

A vehicle having the disclosed moisture detection and regulation system is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
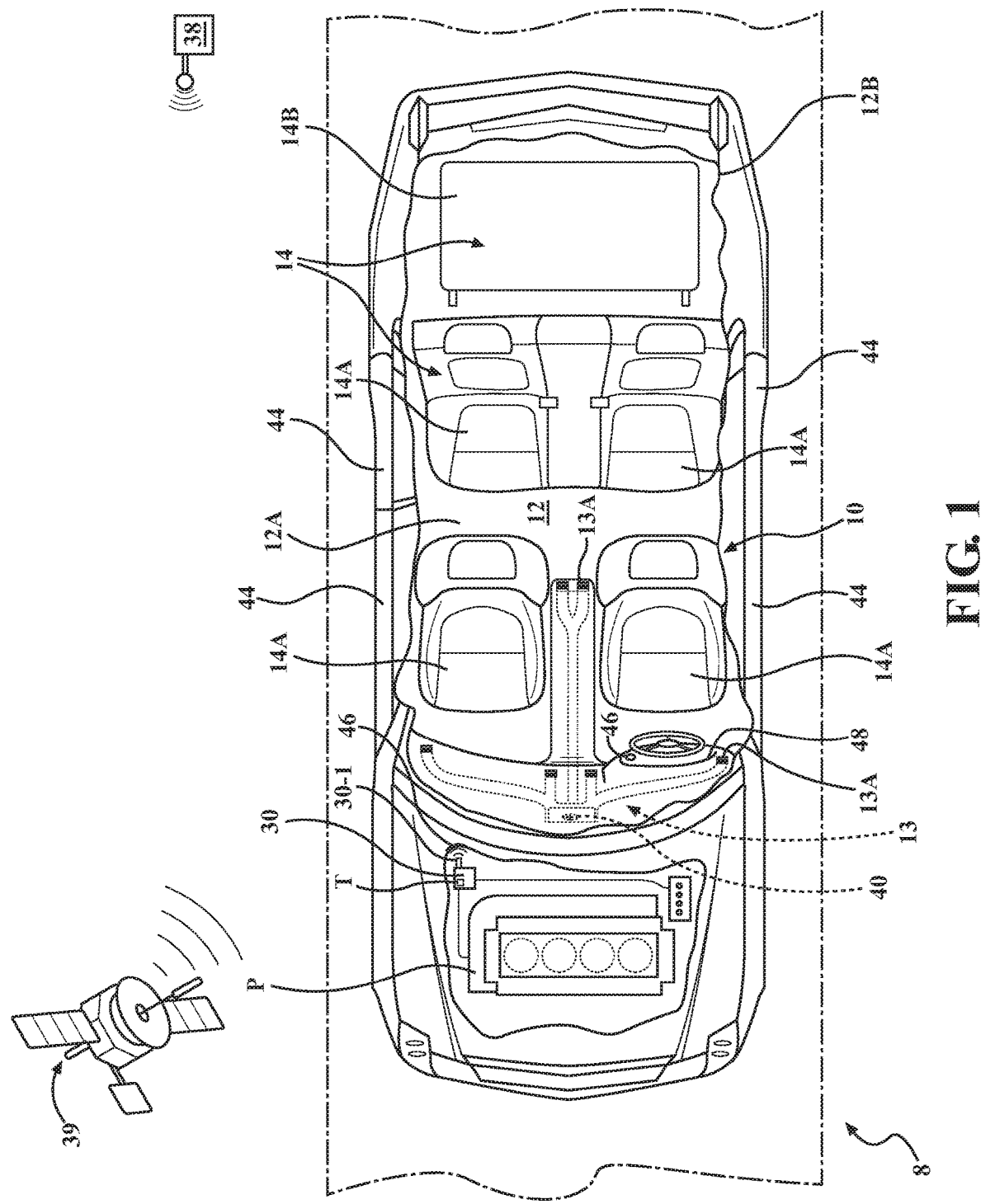
FIG. 1 is a top view of a vehicle having a number of representative vehicle interior components including a moisture absorbent material structure and a moisture detection and regulation system therefor.
Figure 2:
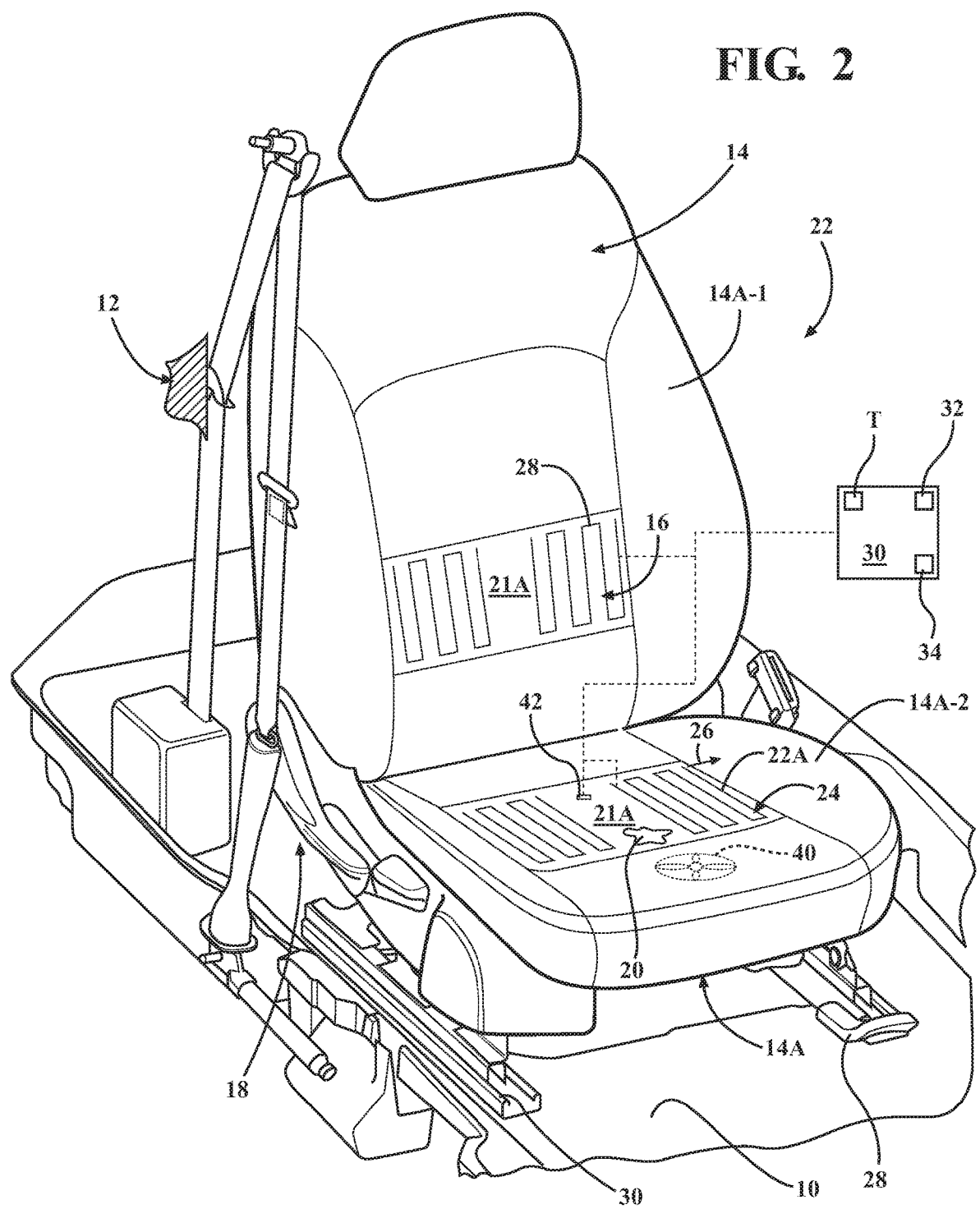
FIG. 2 is a close-up perspective view of the moisture detection and regulation system employed for a seat assembly mounted in the passenger compartment of the vehicle according to one embodiment of the interior component shown in FIG. 1.
Figure 3:
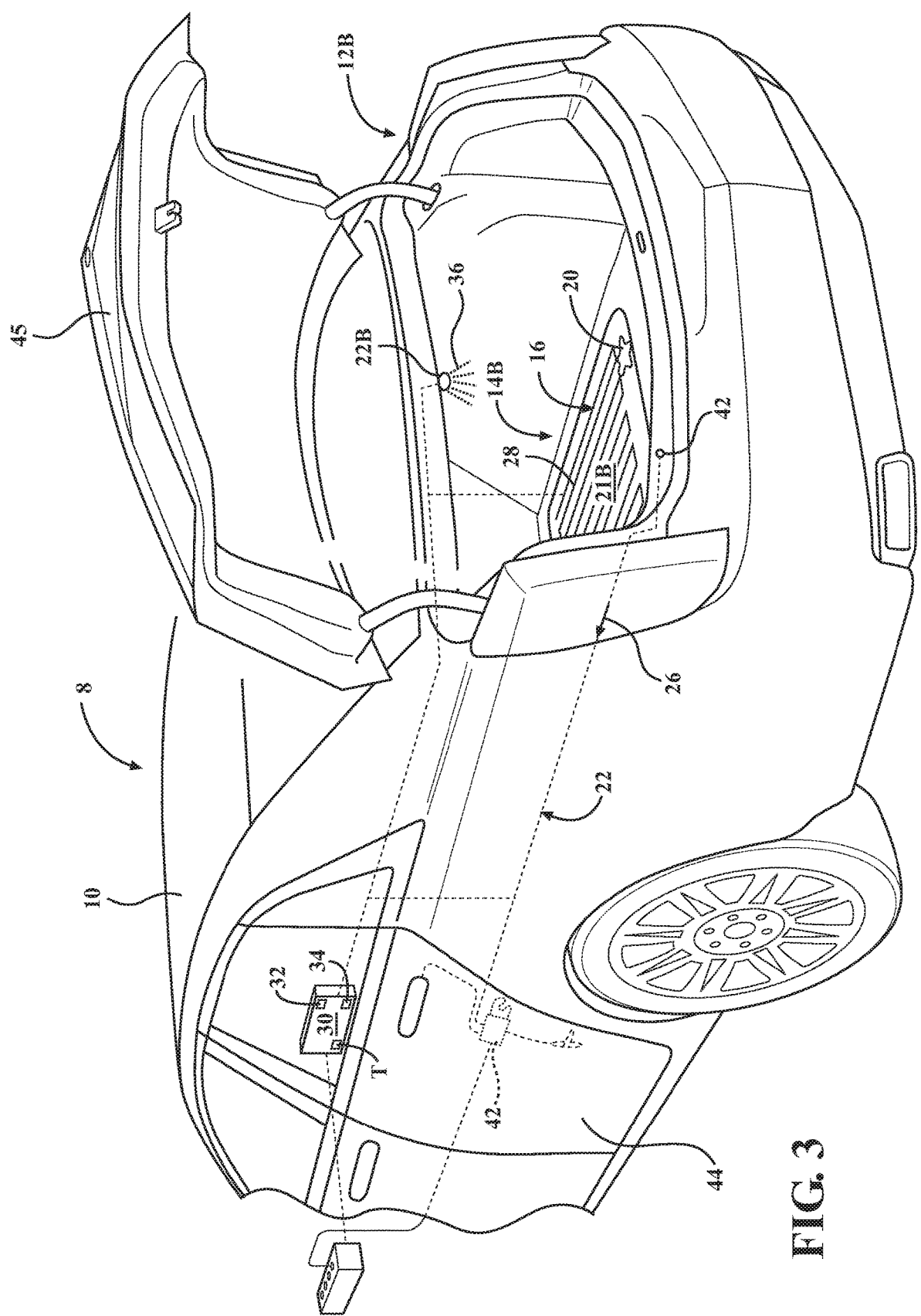
FIG. 3 is a close-up perspective view of the moisture detection and regulation system employed for a shelf mounted in the vehicle trunk according to another embodiment of the interior component shown in FIG. 1.

Referring to the drawings, wherein like reference numbers refer to like components, FIGS. 1-3 show a partial perspective view of a vehicle 8 having a structure 10. The vehicle structure 10 defines or outlines a vehicle interior 12, which, as expressly defined herein, includes a passenger compartment 12A and a vehicle trunk 12B. Such a vehicle 8 may be a standalone, individually operational vehicle, or one of a number of vehicles in a fleet used for rental or shared ride duties. As may be seen in FIG. 1, the vehicle 8 may also include a powerplant P arranged in an underhood compartment separately from the vehicle interior 12.

The vehicle interior 12 typically includes a vehicle's heating, ventilation, and air conditioning (HVAC) system 13. The vehicle interior 12 may also include one or more vehicle components, generally indicated by numeral 14, that are arranged therein. Such vehicle components 14 may be fixed relative to the vehicle interior 12, or, alternatively, may be operatively connected and moveable or adjustable relative to the vehicle structure 10. Specifically, as envisioned herein, a representative vehicle component 14 includes a section of material or fabric 16 having a moisture absorbent material structure 18. In other words, when a liquid or moisture 20 comes in direct contact with the material structure 18, the material absorbs and generally retains the moisture for some period of time, i.e., until the moisture has been removed therefrom by various means. The amount of time the moisture 20 is retained within the section of material 16 may be influenced by ambient conditions, such as humidity level and temperature of surrounding air and objects in direct contact with the subject section of material. The moisture 20 may also be removed from the section of material 16 by application thereto of another moisture absorbent material. Additionally, forced movement or an increase in temperature of ambient air proximate to the section of material 16, or a direct increase in temperature of the subject section of material, may facilitate moisture evaporation therefrom.

An example of the vehicle component 14 may be a seat assembly 14A arranged in the passenger compartment 12A operatively connected to the vehicle structure 10 (shown in FIGS. 1 and 2), and designed to accommodate an operator or a passenger of the vehicle 8. Frequently, such seat assemblies are configured to shift inside the vehicle 8 as well as recline in order to enhance passenger comfort and be moved out of the way to generate useful space for transporting cargo. Such a seat assembly 14A typically includes a backrest 14A-1 and a seating pad 14A-2. The envisioned seat assembly 14A would have at least one upholstered portion 21A, for example as part or all of a seat cushion incorporated into or arranged on either the backrest 14A-1 or the seating pad 14A-2. The upholstered portion 21A of the seat cushion represents a specific embodiment of the section of material 16 that absorbs and retains moisture.

Such seat assemblies 14A are frequently heated and/or ventilated or cooled for enhanced comfort of the seat assembly occupant. Heated seat assemblies typically employ electrical heating elements for increasing temperature of the seat cushion. Both cooled and ventilated cushions typically have a series of chambers inside the seats. Ventilated seat assemblies commonly use fans to blow air into the chambers, while cooled seats have the fan blow air over a cooled surface, such as via an air conditioner, and then into the seat cushion. Perforations in the seat cushions allow the air to reach the occupant.

Another example of the envisioned vehicle component 14 is a shelf, pad, or mat 14B arranged in either the passenger compartment 12A (not shown) or in the trunk 12B (shown in FIGS. 1 and 3). An embodiment of the shelf 14B may be a component adjustable relative to the vehicle interior 12 (shown in FIG. 1) or a component that is fixed in position relative to the vehicle structure 10 (shown in FIG. 3). In general, the pad 14B would have a carpeted or otherwise upholstered portion 21B representing another specific embodiment of the section of material 16 that absorbs and retains moisture. The respective seat assembly and pad embodiments of the vehicle component 14 are herein disclosed solely as suitable examples, and are not intended to be limiting of the type of components that may include the requisite section of material 16. Furthermore, although the present disclosure covers various embodiments of the vehicle component 14, the description below will concentrate primarily on the vehicle seat assembly 14A.

As shown in FIGS. 1-3, a moisture detection and regulation system 22 is employed for the vehicle component 14 having the section of material 16. A liquid spilled onto the section of material 16 may be absorbed and retained by the material for an extended duration, which may become a source of discomfort for the vehicle's user. The moisture detection and regulation system 22 is configured to accelerate removal of moisture 20 from the section of material 16 to facilitate resumption of ordinary or standard exploitation of the vehicle 8. For example, the moisture detection and regulation system 22 may be used to detect moisture 20 on the upholstered portion 21A and dry the upholstered portion, either on the backrest 14A-1 or on the seating pad 14A-2, of the seat assembly 14A, or the upholstered portion 21B of the shelf 14B.

The moisture detection and regulation system 22 includes a sensing device 24 configured to detect a level 26 of moisture in the section of material 16. The system 22 also includes a moisture removal element 28 configured to dissipate the moisture from the section of material 16. The moisture removal element 28 may be either embedded in or mounted proximate the section of material 16, for example, in the respective upholstered portion 21A or 21B of the seat assembly 14A or the pad 14B. Additionally, the system 22 includes an electronic controller 30 in operative communication with each of the sensing device 24 and the moisture removal element 28. The controller 30 may be an electronic control unit (ECU) for the vehicle 8 or a stand-alone electronic controller. The controller 30 includes a memory that is tangible and non-transitory. The memory may be a recordable medium that participates in providing computer-readable data or process instructions. Such a medium may take many forms, including but not limited to non-volatile media and volatile media.

Non-volatile media used by the controller 30 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 30 may also include a flexible disk, hard disk, magnetic tape, other magnetic medium, a CD-ROM, DVD, other optical medium, etc. The controller 30 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 30 or accessible thereby may be stored in the memory and automatically executed to provide the required functionality.

The controller 30 is be configured, i.e., structured and programmed, for operating the moisture detection and regulation system 22. Specifically, the electronic controller 30 is configured to receive a signal 32 from the sensing device 24 indicative of the detected level 26 of the moisture 20 in the section of material 16 and activate the moisture removal element 28 when the detected level 26 of the moisture 20 is equal to or greater than a predetermined threshold level 34 of the moisture. In general terms, the predetermined threshold level 34 of the moisture 20 maybe defined as a moisture limit below which the section of material 16 is considered to be sufficiently dry. The sensing device 24 may be an electrical element 22A. The electrical element 22A may be a heating element otherwise used to generate heat energy to increase the temperature of, i.e., warm up, the upholstered portion 21A of the seat cushion in the seat assembly 14A for enhanced passenger comfort during cold ambient temperatures. In the embodiment of the system 22 using the electrical element 22A, the electronic controller 30 may be configured or programmed to determine, either continuously or at predetermined intervals, an instantaneous electrical resistance or conductivity of the electrical element by directing a predetermined value of electrical current through and assessing the resultant voltage across the electrical element. Thus determined, instantaneous resistance of the electrical element 22A may also be employed by the controller 30 to assess a rate of change of the subject resistance.

Additionally, the type of liquid 20 that comes in contact with the electrical element 22A, for example water, coffee or soda, may be identified by determining an amount of salt or sugar concentration present in the subject liquid. Specifically, the electrical resistance of the electrical element 22A varies in response to the amount of salt and sugar in the subject liquid 20. As a result, specific rates of change of electrical resistance of the electrical element 22A may be indicative of specific liquids, such as soda, coffee, or brine, and their salt/sugar content. Such specific rates of change of electrical resistance of the electrical element 22A may be predetermined empirically, and subsequently programmed into the controller 30. Accordingly, when the host vehicle 8 is in service, the controller 30 may compare such predetermined rates of change of the subject resistance of the electrical element 22A with the determined present rate of change of electrical resistance to determine the identity or type of the liquid 20 present in the section of material 16.

Alternatively, the sensing device 24 may be an infrared sensor 22B (shown in FIG. 3). The infrared sensor 22B may be fixed to the vehicle structure 10 and employed to detect an image 36 indicative of the level 26 of moisture in the section of material 16, such as in the upholstered portion 21A of the seat cushion. The infrared sensor 22B may be trained on the specific vehicle component 14 and configured to communicate an instantaneous image 36 of the wet section of material 16 to the controller 30. In turn, the controller 30 may be configured to determine a rate of change in the image 36 indicative of the evaporation of the moisture 20 from the wet section of material 16. Such a determined rate of change in the image 36 may be compared via the controller 30 with empirically predetermined and programmed therein rates of change in the subject image. Such a comparison would facilitate identification, via the controller 30, of the type of liquid 20 present on the section of material 16, analogous the determination described above with respect to the electrical element 22A.

Using either the electrical element 22A or the infrared sensor 22B, as described above, the electronic controller 30 may be configured to determine a rate of change of the detected level 26 of moisture 20 in the section of material 16. Furthermore, the electronic controller 30 may use the rate of change of the detected level 26 of moisture 20 to predict or forecast an amount of time T required to reduce the detected level of moisture in the section of material below the predetermined threshold level 34 of moisture. The controller 30 may be additionally configured to communicate the predicted amount of time T to a user of the vehicle 8 or to a fleet vehicle monitor 38 (shown in FIG. 1), such as a master controller. To facilitate such communication, the electronic controller 30 may be connected to the fleet vehicle monitor 38 through an Earth-orbiting or stationary satellite(s) 39, such as via an antenna 30-1, or via a cloud-based network.

For example, the fleet vehicle monitor 38 may be employed to coordinate scheduling for rental or shared ride duties of a multiple vehicle fleet including a number of vehicles similar to the vehicle 8. Accordingly, the fleet vehicle monitor 38 may interface with the moisture detection and regulation system 22 via the connection with the controller 30 to select the vehicle, such as the vehicle 8, having the respective component 14 with the detected level 26 of moisture 20 below the predetermined threshold level 34. Furthermore, the fleet vehicle monitor 38 may schedule the vehicle 8 for use following the amount of time T has elapsed. Alternatively, to expedite return of the vehicle 8 into service, based on the forecast amount of time T, the fleet vehicle monitor 38 may generate a decision to remove the subject component 14 out of the vehicle and replace it with another, similar component.

As indicated above, the controller 30 will activate the moisture removal element 28 in response to the determination that the detected level 26 of the moisture 20 is equal to or greater than the predetermined threshold level 34 of moisture. As shown in FIGS. 2 and 3, such a moisture removal element 28 may be the electrical heating element 22A previously described with respect to its capacity as the sensing device 24. Alternatively, such a moisture removal element 28 may be a fan 40 (shown in FIG. 2) mounted within the vehicle interior 12 and configured to blow air onto or through the section of material 16 to thereby dissipate the moisture 20 therein. The fan 40 may be specifically mounted on the seat assembly 14A or on the pad 14B, or in close proximity thereto. Another embodiment of the fan 40 may be a fan unit included as part of the HVAC system 13 and configured to blow air through a plurality of strategically positioned air registers 13A into the passenger compartment 12A, as shown in FIG. 1.

The electronic controller 30 may be additionally configured to activate the moisture removal element 28, when the detected level 26 is equal to or greater than the predetermined threshold level 34 of moisture, at each predetermined event when the section of material 16 is unoccupied, whether by a passenger or an object. For example, the section of material 16 may be determined as being unoccupied when the seat assembly 14A or the trunk pad 14B is vacant, i.e., neither a passenger nor an object is present on the section of material. A sensor 42 (shown in FIG. 2) in electronic communication with the controller 30 may be used to facilitate detection of whether the section of material 16 is occupied. Such a sensor 42 may be a remote optical eye or a strain gauge embedded directly in the specific vehicle component 14, proximate or within the section of material 16. An embodiment of the sensor 42 may be used to detect an opening of a vehicle door 44 (shown in FIGS. 1 and 3) or a trunk lid 45 (shown in FIG. 3) following a powering down of the vehicle's powerplant P, which may be identified as indicative of the occupant(s) of the vehicle disembarking the seat assembly 14A.

As shown in FIG. 1, the moisture detection and regulation system 22 may additionally include a sensory input element 46 in electronic communication with the controller 30. The electronic controller 30 may be further configured to activate the sensory input element 46 and thereby generate a warning signal indicative of the detected level 26 of moisture and/or the identified type of liquid 20 present in the section of material 16, for example to a user of the vehicle or to the fleet vehicle monitor 38. The sensory input element 46 may be a digital code electronically transmitted to the fleet vehicle monitor 38, or a warning light or textual message displayed to the vehicle's operator, for example on an instrument panel 48 of the vehicle 8.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A moisture detection and regulation system for a vehicle component arranged within an interior of the vehicle and including a section of material having a moisture absorbent material structure, the system comprising:
    a sensing device configured to detect a level of moisture in the section of material;
    a moisture removal element configured to dissipate the moisture from the section of material; and
    an electronic controller in operative communication with each of the sensing device and the moisture removal element, and configured to receive a signal from the sensing device indicative of the detected level of the moisture in the section of material and activate the moisture removal element when the detected level of the moisture is equal to or greater than a predetermined threshold level of the moisture;
    wherein:
        the moisture removal element is an electrical element mounted proximate the section of material, and configured to generate heat energy and impart the heat energy to the section of material;
        the sensing device is the electrical element; and
        the electronic controller is configured to determine an instantaneous resistance of the electrical element to thereby identify a type of liquid present in the section of material.

2. The system of claim 1, wherein the vehicle component is a seat assembly having a seat cushion, and wherein the moisture removal element is one of embedded in and mounted proximate the seat cushion.

3. The system of claim 2, wherein the seat assembly includes a backrest and a seating pad, and wherein the seat cushion is incorporated into one of the backrest and the seating pad.

4. The system of claim 1, wherein the moisture removal element is a fan mounted within the interior of the vehicle and configured to blow air onto the section of material to thereby dissipate moisture therein.

5. The system of claim 1, further comprising a sensory input element, wherein the electronic controller is configured to activate the sensory input element to thereby generate a signal indicative of at least one of the detected level of moisture and the identified type of liquid present in the section of material.

6. The system of claim 1, wherein the sensing device is an infrared sensor employed to detect an image indicative of the level of moisture in the section of material.

7. The system of claim 1, wherein the electronic controller is configured to determine a rate of change of the detected level of moisture in the section of material and predict an amount of time required to reduce the detected level of moisture in the section of material below the predetermined threshold level of moisture.

8. The system of claim 1, wherein the electronic controller is configured to activate the moisture removal element at each predetermined event when the section of material is unoccupied.

9. A vehicle comprising:
    a vehicle structure defining a vehicle interior;
    a vehicle component arranged within the vehicle interior and including a section of material having a moisture absorbent material structure; and
    a moisture detection and regulation system including:
        a sensing device configured to detect a level of the moisture in the section of material;
        a moisture removal element configured to dissipate the moisture from the section of material; and
        an electronic controller in operative communication with each of the sensing device and the moisture removal element, and configured to receive a signal from the sensing device indicative of the detected level of the moisture in the section of material and activate the moisture removal element when the detected level of the moisture is equal to or greater than a predetermined threshold level of the moisture;
    wherein:
        the moisture removal element is an electrical element mounted proximate the section of material, and configured to generate heat energy and impart the heat energy to the section of material;
        the sensing device is the electrical element; and
        the electronic controller is configured to determine an instantaneous resistance of the electrical element to thereby identify a type of liquid present in the section of material.

10. The vehicle of claim 9, wherein the vehicle component is a seat assembly having a seat cushion, and wherein the moisture removal element is one of embedded in and mounted proximate the seat cushion.

11. The vehicle of claim 10, wherein the seat assembly includes a backrest and a seating pad, and wherein the seat cushion is incorporated into one of the backrest and the seating pad.

12. The vehicle of claim 9, wherein the moisture removal element is a fan mounted within the interior of the vehicle and configured to blow air onto the section of material to thereby dissipate moisture therein.

13. The vehicle of claim 9, further comprising a sensory input element, wherein the electronic controller is configured to activate the sensory input element to thereby generate a signal indicative of at least one of the detected level of moisture and the identified type of liquid present in the section of material.

14. The vehicle of claim 9, wherein the sensing device is an infrared sensor employed to detect an image indicative of the level of moisture in the section of material.

15. The vehicle of claim 9, wherein the electronic controller is configured to determine a rate of change of the detected level of moisture in the section of material and predict an amount of time required to reduce the detected level of moisture in the section of material below the predetermined threshold level of moisture.

16. The vehicle of claim 9, wherein the electronic controller is configured to activate the moisture removal element at each predetermined event when the section of material is unoccupied.

* * * * *